(12) United States Patent
Weedon et al.

(10) Patent No.: US 6,650,597 B2
(45) Date of Patent: Nov. 18, 2003

(54) TIMING SYSTEMS

(75) Inventors: Robert John Weedon, Romsey (GB); Keith Roland Stribley, West Byfleet (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 10/203,884
(22) PCT Filed: Feb. 14, 2001
(86) PCT No.: PCT/GB01/00595
§ 371 (c)(1), (2), (4) Date: Jan. 10, 2003
(87) PCT Pub. No.: WO01/61426
PCT Pub. Date: Aug. 23, 2001

(65) Prior Publication Data
US 2003/0156498 A1 Aug. 21, 2003

(30) Foreign Application Priority Data
Feb. 16, 2000 (GB) .............................................. 0003486

(51) Int. Cl.[7] ............................. G04C 11/02; H04B 7/85
(52) U.S. Cl. ..................................... 368/47; 342/357.06
(58) Field of Search ............................. 368/10, 46, 47; 342/352, 357.06, 357.13; 701/213–215

(56) References Cited

U.S. PATENT DOCUMENTS 4,449,830 A * 5/1984 Bulgier ....................... 368/119
5,225,842 A * 7/1993 Brown ........................ 342/357
5,319,374 A * 6/1994 Desai .......................... 368/47

FOREIGN PATENT DOCUMENTS

WO          99/53338          10/1999

* cited by examiner

Primary Examiner—Vit Miska
(74) Attorney, Agent, or Firm—Crowell & Moring LLP

(57) ABSTRACT

A time interval measurement system for the timing between events occurring at two spaced apart locations comprising at each location a dual frequency Global Positioning System (GPS) receiver having operatively associated with it a GPS antenna, wherein both the GPS receiver and the antenna are dual frequency (L1, L2) and the former is capable of both Coarse Acquisition (C/A) Code and carrier phase measurements, an accurate frequency reference source giving local time, a data-logger for logging the GPS data, a Time Interval Counter (TIC) means is used to measure the time of a local event relative to the local time and further comprising a central processor system (CPS) and a communication system via which the logged GPS data and time interval data are received at the CPS from each location, the CPS being arranged to derive a time-offset figure, in accordance with a predetermined algorithm which is indicative of the difference between times as measured in dependence upon the frequency reference sources at the two locations.

9 Claims, 2 Drawing Sheets

TIMING SYSTEMS

This invention relates to timing systems and more especially but not exclusively it relates to the measurement of precise time intervals between events at mutually spaced locations.

The precise timing (that is to within an accuracy of 1 nanosecond) of events, such as the period between reception of pulses, or the generation of synchronised pulses, presents little difficulty when the pulses are received or produced (as the case may be) at the same location. However, precise timing of events at locations spaced several kilometres apart, is much more problematic if line of sight communication between the sites is not possible. In order to provide the required degree of accuracy with known systems a very stable (and therefore expensive) reference clock, such as a Caesium frequency source, must be used in conjunction with a basic GPS Common View synchronisation technique.

It is an object of the present invention to provide a relatively inexpensive time interval measurement system for achieving precise timing of events at widely spaced locations.

According to the present invention a time-interval measurement system for the timing between events occurring at two spaced apart locations comprises at each location a dual frequency Global Positioning System (GPS) receiver having operatively associated with it a GPS antenna, wherein both the GPS receiver and the antenna are dual frequency (L1, L2) and the former is capable of both Coarse Acquisition (C/A) Code and carrier phase measurements, an accurate frequency reference source giving local time, a data-logger for logging the GPS data, a Time Interval Counter (TIC) means is used to measure the time of a local event relative to the local time and further comprising a central processor system (CPS) and a communication system via which the logged GPS data and time interval data are received at the CPS from each location, the CPS being arranged to derive a time-offset figure, in accordance with a predetermined algorithm which is indicative of the difference between times as measured in dependence upon the frequency reference sources at the two locations.

It will be appreciated that the time interval figure can be applied to the TIC measurements to calculate precise, relative, time difference between events occurring at the two locations.

The frequency source may be integral with the GPS receiver. Alternatively the GPS receiver may be adapted to receive a clock signal from an external source.

The frequency source may, for example, be a quartz crystal oscillator or a rubidium oscillator, which provide good short-term stability at modest cost.

The dual frequency GPS antenna may have calibrated group delay characteristics over temperature. Alternatively the antenna may comprise a passive dual-band patch with a short cable run, thereby removing the need for amplifiers which might give non-reproducible temperature characteristics.

The data logger may be a personal computer (PC). The CPS may be co-located at one of the GPS receiver locations and may also comprise a PC.

It will be appreciated that the system may be used in applications where the timing of events at several widely spaced locations is required, the appropriate time intervals being computed in each case.

The system may, for example, receive a designated pulse at two or more locations. The time interval measurements can then be applied to the local TIC measurements to allow the precise calculation of the absolute time offset between the pulses. Alternatively the system may feed back the measured time intervals to synchronise operational events at two or more locations.

One embodiment of the invention will now be described, by way of example, with reference to the accompanying drawings in which.

Figure 1:
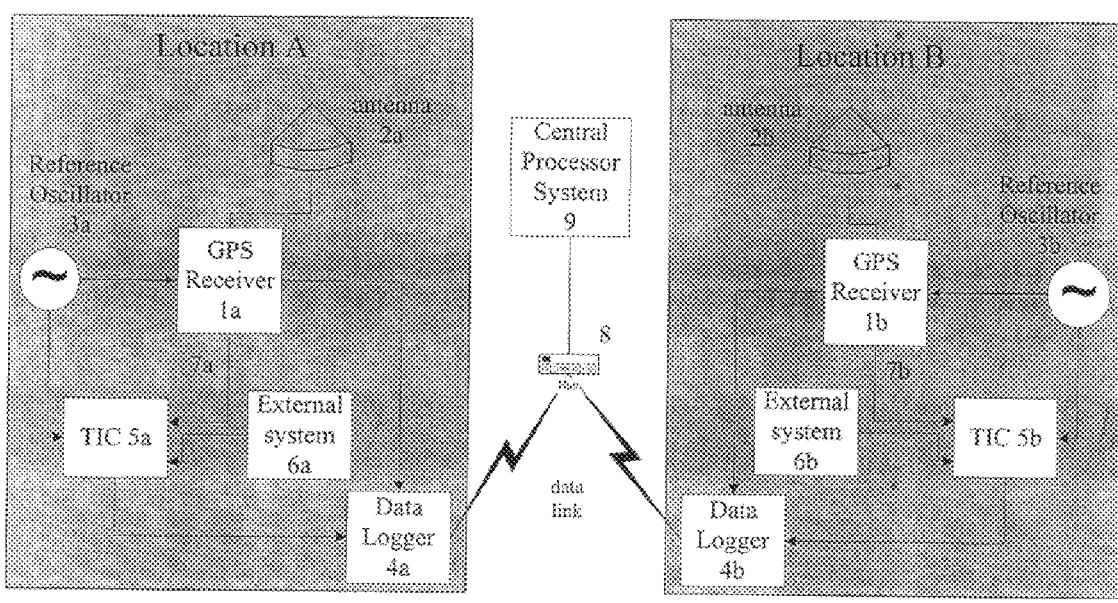
FIG. 1 is a schematic block diagram of a time interval measurement system for use at two widely spaced locations.

Consider now the system at location A as shown in FIG. 1. A GPS receiver (1a) receives signals on both L1 and L2 frequencies from all the GPS satellites in view of an antenna (2a). An internal clock of the GPS receiver (1a) is locked to the frequency of an oscillator (3a), which in this case is external to the GPS receiver (1a). The GPS receiver sends data to a data-logger (4a) at regular intervals and for each satellite in view this data comprises: a C/A code pseudo-range measurement; carrier phase data (in the form of an Accumulated Doppler Range (ADR) measurement on both L1 and L2 frequencies) and ephemeris data (from which the satellite's position can be calculated).

A Time Interval Counter (5a) uses the frequency from the reference oscillator (3a) to measure the time difference between the arrival of a pulse from an external system (6a) and a pulse from a GPS receiver's clock (7a). This measurement is sent to the data logger (4a).

The measurement data is continuously sent from the Data Logger (4a) over the data link, which in this example is an Ethernet link, to a CPS (8).

Similar apparatus is provided at a location B, which bears the same numerical designation distinguished by a 'b' suffix.

The CPS (8) collates the data from the data-loggers (4a, 4b) for each time interval. An algorithm is then applied to the collated data to extract the time interval between the two receiver clocks. This time interval is then applied to the Time Interval measurements to determine the precise time interval between the pulses from 6a and 6b.

Figure 2:
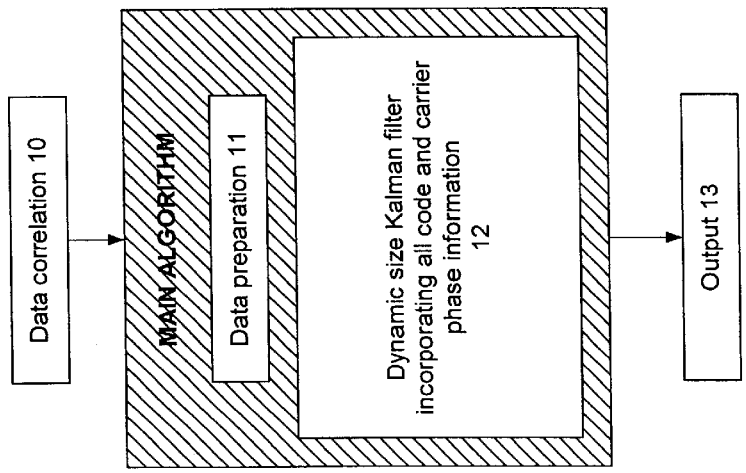
FIG. 2 is a diagram showing the main stages of an algorithm as used by a processor forming a part of the system of FIG. 1.

The algorithm used in the CPS (7) has four main stages 10, 11, 12 and 13, as shown in FIG. 2. As can be seen from FIG. 2, the majority of the algorithm comprises a dynamically sized Kalman filter 12. Before considering the filter 12, it is necessary to further discuss other parts of the algorithm and the mathematical formulation required.

In order to help achieve the required accuracy, the system works in a Differential GPS (DGPS) mode to provide a time offset measurement. To provide this data, the outputs from the two GPS receiver locations (A, B) must be correlated, stage 12, using the timestamp information, which is included within the data. At this stage the data from the two receivers is correlated into data for the same satellite and frequency. The data from any satellites that are not visible to both receivers is discarded. (This is what is meant by the term Common View as herein before referred to).

Having collated the data, stage 10, it must be processed, stage 11, to prepare it for input into the Kalman filter stage 12. Key to this, is the concept of 'pseudo-range residual', and 'Accumulated Doppler Range' measurements. The pseudo-range residual is the difference between the measured C/A code pseudo-range and the expected range to the satellite (from ephemeris and pre-surveyed antenna position).

These terms/techniques are well understood by those skilled in the GPS art and a full description of the concepts and equations used for the formulation of the filter may be found in: Global Positioning System: Theory and Applications Volume I/II. Edited by Bradford W Parkinson and James J Spilker Jr. Associate Editors Penina Axelrad and Per Enge., and; Progress in Astronautics and Aeronautics, Volume 163.

Since the foregoing is established art a further full description herein is believed to be unnecessary and accordingly the following brief description only will be given.

The pseudo-range residual $\rho_r$ may be used to determine the timing difference ($b_A$) between the local clock at a given GPS receiver location, (say location 'A') and GPS time directly using the civilian L1 frequency code measurements. The carrier-phase information can also be used to measure this offset, and is much more accurate, but includes an unknown, fixed constant which must be determined (the integer ambiguity, $N_A$).

In differential terms, we have an equation for the offset between the two locations (A and B) $\Delta b$ thus:

$$\Delta b = b_B - b_A \text{(where both } b_B \text{ and } b_A \text{ contain terms both due to the antenna/cabling delay and time offset).}$$

As mentioned above, the value of $\Delta b$ can be expressed by functions of the code ($f_1$) and carrier phase ($f_2$), data, giving;

$$\Delta b = f_1(\Delta \rho_r) = f_2(\Delta ADR, \Delta N),$$

where $\Delta$ indicates location B minus location A.
More specifically:

$$f_1(\Delta \rho_r) = \frac{\overline{\Delta \rho_r}}{c}$$

where c is the speed of light and the bar indicates a weighted average of the individual $\rho_r$.

$$f_2(\Delta ADR, \Delta N) = -\left(\frac{\Delta n}{\gamma} + \frac{\Delta ADR}{\gamma} + \frac{\Delta R}{c}\right),$$

where $\gamma$ is the frequency of the GPS signal and R is the distance from a receiver to the satellite.

In general, the differential pseudo-range residual measurement is a weighted average of the value for each satellite in common view to both Receiver Sites, thus always giving only one value (and one instance of the $f_1$ function). The carrier phase data must be repeated for each satellite however, and will give a number of instances of the $f_2$ function, which will change as different satellites come in and out of view. Considering now the Kalman filter, the basic principles of a Kalman filter are well known, and described in *Kalman Filtering: Theory and Practice* Grewal and Andrews, Prentice-Hall, 1993 amongst other places. Therefore, as in the description above, only a very basic description is given herein.

Figure 3:
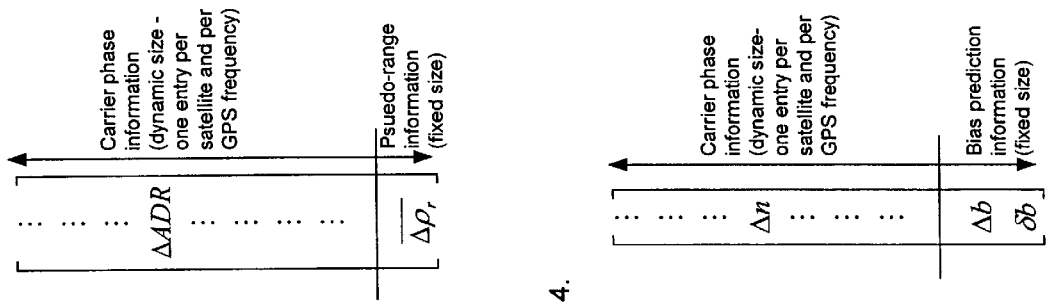
FIGS. 3 and 4 show respectively the measurement update and state vectors for a Kalman filter as shown in FIG. 2.
Figure 4:
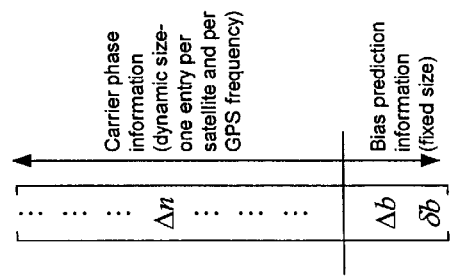

As is apparent from the reference given above, the key to the formulation of a Kalman filter is its state vector and measurement vector which in this case are shown in FIGS. 3 and 4. The state vector is initialised at start up using $f_1$ and from then on updated at each time interval using the current data in the measurement vector and the normal Kalman Filter update equations. For the purposes of this work, the state vector contains the prediction of time offset between sites, $\Delta b$, the rate of change of this value, $\delta b$, and the integer ambiguity values for the carrier phase information, $\Delta N$ per satellite and GPS frequency. This is shown in FIG. 3.

The measurement vector as shown in FIG. 4, contains the information from carrier phase (one Accumulated Doppler Range value per satellite and GPS frequency) and code data (a single weighted average value of the pseudo-range residuals).

It will be appreciated that the system as herein described may find various applications and accordingly modifications may be made to the system described without departing from the scope of the invention as broadly conceived. For example, the system may be used to measure the height of an aircraft using the difference in the times of arrival of a signal transmitted from an aircraft, and then received at several widely spaced locations.

What is claimed is:

1. A time interval measurement system for the timing between events occurring at two spaced apart locations comprising at each location a dual frequency Global Positioning System (GPS) receiver having operatively associated with it a GPS antenna, wherein both the GPS receiver and the antenna are dual frequency (L1, L2) and the former is capable of both Coarse Acquisition (C/A) Code and carrier phase measurements, an accurate frequency reference source giving local time, a data-logger for logging the GPS data, a Time Interval Counter (TIC) means is used to measure the time of a local event relative to the local time and further comprising a central processor system (CPS) and a communication system via which the logged GPS data and time interval data are received at the CPS from each location, the CPS being arranged to derive a time-offset figure, in accordance with a predetermined algorithm which is indicative of the difference between times as measured in dependence upon the frequency reference sources at the two locations.

2. A system as claimed in claim 1, wherein the frequency reference source is integral with the GPS receiver.

3. A system as claimed in claim 1, wherein the GPS receiver is adapted to receive a clock signal from an external source.

4. A system as claimed in claim 1, wherein the frequency reference comprises a quartz crystal oscillator or a rubidium oscillator.

5. A system as claimed in claim 1, wherein the dual frequency GPS antenna has calibrated group delay characteristics with temperature.

6. A system as claimed in claim 1, wherein the antenna comprises a passive dual-band patch with a short cable run removing the need for amplifiers or filters which might give unpredictable temperature characteristics.

7. A system as claimed in claim 1, the data logger comprises a PC.

8. A system as claimed in claim 1, wherein the CPS is co-located with one of the GPS receivers.

9. A system, as claimed in claim 1, used to measure the time difference between reception of pulses, transmitted from an aircraft and received at several spaced apart locations, from which the height of the aircraft can be established.

* * * * *